United States Patent [19]
Walker, Jr.

[11] 3,809,983
[45] May 7, 1974

[54] VARIABLE SPEED MOTOR
[75] Inventor: Peter Walker, Jr., Brooklyn Park, Minn.
[73] Assignee: Electro-Craft Corporation, Hopkins, Minn.
[22] Filed: Nov. 8, 1972
[21] Appl. No.: 304,766

[52] U.S. Cl.............. 318/340, 318/361, 318/347, 310/140, 310/154
[51] Int. Cl..................... H02p 5/06, H02k 23/04
[58] Field of Search .......... 310/136, 139, 148, 140, 310/154; 318/340, 495, 499, 337, 347, 360, 361, 316, 439

[56] References Cited
UNITED STATES PATENTS
| | | | |
|---|---|---|---|
| 1,071,920 | 9/1913 | Hill | 310/148 |
| 1,254,221 | 1/1918 | Fynn | 310/136 |
| 1,377,074 | 5/1921 | Holt | 310/148 |
| 2,469,382 | 5/1949 | Gayley | 318/340 |
| 3,184,627 | 5/1965 | Sears | 310/136 |

Primary Examiner—Bernard A. Gilheany
Assistant Examiner—Thomas Langer
Attorney, Agent, or Firm—Carlsen, Carlsen and Sturm

[57] ABSTRACT

A controlled speed direct current motor in which the magnitude of the flux field in which the motor armature is operative is controlled in accordance with the energization of selected armature windings independently of the armature motor drive windings. This is accomplished by the use of separate independent brushes which are adapted to coact with the usual commutator on the rotating armature so as to simultaneously energize selected coil windings on the armature independently of the coil windings of the armature which are energized from a source of electrical current to cause the motor to operate. By utilizing a variable source of current for energizing the selected armature windings the field set up by the independent energization of the selected windings may be utilized to add to or subtract from the flux field normally utilized in the motor.

10 Claims, 3 Drawing Figures

PATENTED MAY 7 1974 3,809,983

3,809,983

VARIABLE SPEED MOTOR

SUMMARY OF THE INVENTION

A controlled speed direct current motor in which the armature is used to create a flux field for controlling the effect of the flux from a primary source of magnetic energy in the motor. This is accomplished by variably energizing windings on a rotating armature when they are in a position to establish a secondary magnetic field that is effectively parallel to that supplied to the motor by the primary source of magnetic energy and the direction of the current flow determines the direction of the secondary magnetic field which may then be used to add to or subtract from the primary source of magnetic energy. Simultaneously, the normal motor action is attained by commutating selected other coil windings on the armature so that the current flow therethrough may coact with the magnet flux provided by the primary source of magnetic energy, as modified.

One object of my invention is to provide an improved controlled speed direct current electric motor which is uncomplicated, inexpensive and accurate.

DESCRIPTION OF THE PREFERRED EMBODIMENT

Figure 1:
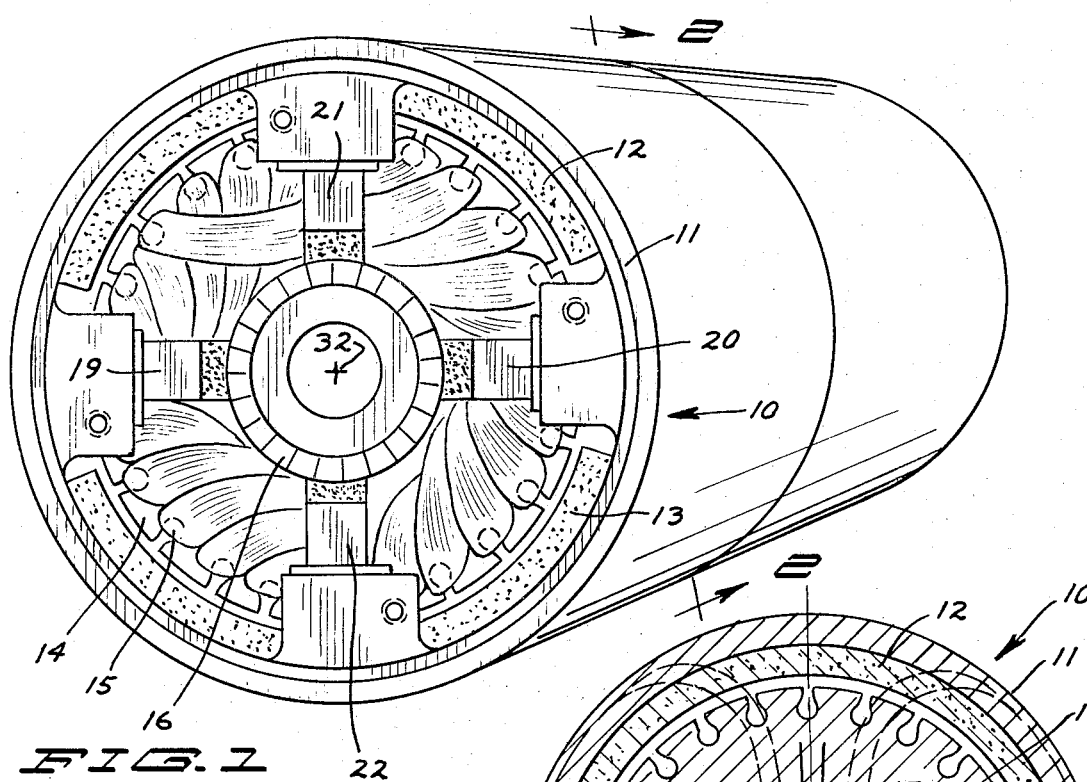
FIG. 1 is a diagrammatic perspective representation of a direct current electric motor with one end cover removed to illustrate the details which form one embodiment of my invention.

Referring now to the drawings, a permanent magnet D.C. motor, indicated generally by reference character 10, is shown having a metallic tubular cylindrical housing 11 which is symmetrical about a longitudinal axis 32. A pair of permanently magnetized arcuately shaped longitudinally elongated magnets 12 and 13 are shown disposed generally along top and bottom interior portions of housing 11. An armature 14 having a plurality of windings 15 and a commutator 16 is shown disposed for rotation about axis of rotation 32 coincident with the center axis of motor housing 11. Armature 14 may be of conventional construction having elongated coils disposed in slots extending longitudinally of the armature and having ends connected to adjacent commutator segments. Such armatures are well known to those skilled in the art and further detail need not be given to properly illustrate the principles of my invention.

However, reference is made to pp. 2–7 to 2–14 of a publication entitled "D.C. Motors, Speed Controls, Servo Systems" in *Engineering Handbook* by Electro-Craft Corporation, 1600 Second Street South, Hopkins, Minnesota 55343, 1972, for a discussion of the general principles of operation of D.C. motors.

In the two-pole motor used to illustrate my invention in this detailed description, a flux field is established by radially polarizing magnets 12 and 13 to provide a field having magnetic lines of flux illustrated by reference character 17 and this may also be referred to as the primary source of magnetic energy for motor 10. It may be understood that the source of magnetic energy may comprise other forms of apparatus for establishing magnetic flux patterns of the general configuration illustrated by lines 17.

A pair of drive brushes 19 and 20 may be connected to a suitable source of direct current (not shown) and upon energizing the same, the normal motor action of a D.C. motor will occur and armature 14 will rotate in a direction determined by the direction of the current applied to the coil windings to which brush members 19 and 20 are connected through the segments on commutator 16 on armature 14.

Figure 2:
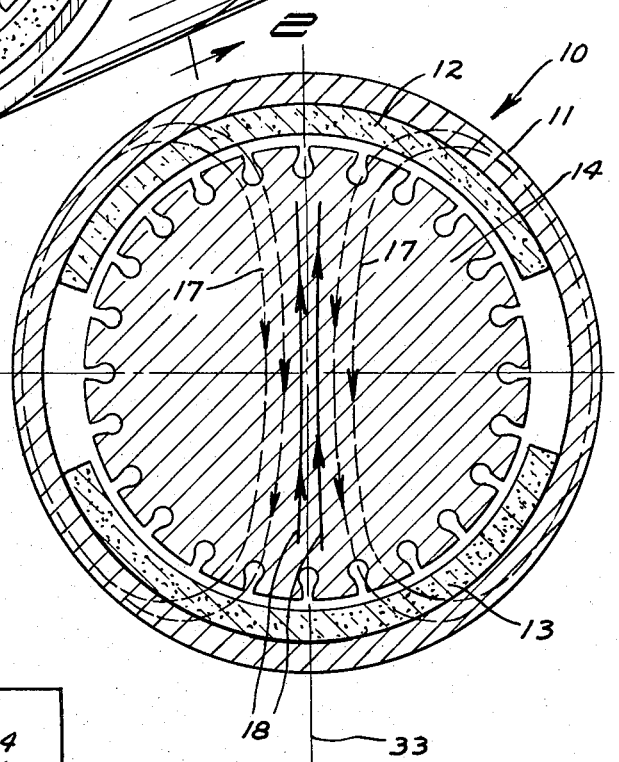
FIG. 2 is a sectional view of the motor taken along section lines 2—2 on FIG. 1 of the drawings.

When it is desired to variably control the speed of the motor, current of suitable magnitude and polarity is applied to brushes 21 and 22 that are spaced in the illustrated embodiment ninety electrical degrees from brushes 19 and 20, respectively, and which serve to connect to selected coil windings on armature 14 through the segments on commutator 16 so as to simultaneously energize the armature coil windings so as to create a magnetic field having a direction generally parallel to flux lines 17 as indicated by reference characters 18 applied to the flux lines extending generally upwardly at the center of FIG. 2 of the drawings. For the purposes of orientation, an axis 33 extending vertically through the motor may be referred to as a direct axis and an axis 34 extending generally horizontally through motor 10 is referred to as a quadrature axis and the current applied to the direct axis brushes 21 and 22 is utilized to provide the desired $K_e$ for the motor action whereas the current supplied to brushes 19 and 20 on the quadrature axis will be the load or drive current supplied to the motor. Either or both of the brush pairs illustrated may be circumferentially adjustable to provide control of the effect of flux lines 18 in magnitude and direction.

Figure 3:
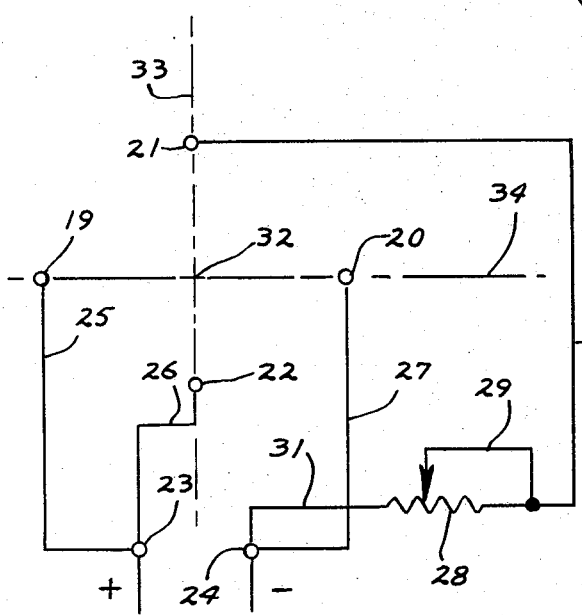
FIG. 3 is an electrical schematic diagram illustrating an electrical circuit for energizing the motor incorporating the principles of my invention.

As may be seen in FIG. 3 of the drawings, a schematic diagram shows quadrature axis brushes 19 and 20 connected to terminals 23 and 24 through conductors 25 and 27, respectively, and direct axis brushes 21 and 22 connected to terminals 23 and 24 through conductor 26 and through conductor 30, potentiometer 28 having a wiper 29 and conductor 31, respectively. Terminals 23 and 24 are adapted for connection to a suitable source of direct current energy which may be of the polarity shown on the drawings.

While it is known that my invention may be operative with various other forms of direct current motors, it may be appreciated that it is particularly well adapted to the permanent magnet type of electric motor wherein there is virtually no way of controlling the primary magnetic field. It may also be appreciated that the permanent magnet form of direct current motor has been determined to be the most efficient from the standpoint of economical fabrication and operation for many applications.

Having now therefore fully illustrated and described my invention, what I claim to be new and desire to protect by Letters Patent is:

1. In a variable speed direct current electric motor, including a frame, a substantially constant source of magnetic energy, an armature journaled in said frame for rotation within said magnetic field, said armature including a plurality of windings and commutator means for selectively connecting certain of said windings to a source of electrical current, the improvement comprising commutator means for simultaneously, variably, selectively energizing other of the windings on said armature to vary the effective magnitude of the field of said source of magnetic energy.

2. The apparatus of claim 1 in which the means for variably selectively energizing others of the windings is operative to connect said windings to a source of electric current independently of the other windings on the armature.

3. The apparatus of claim 2 in which the means for selectively connecting the windings to a source of electrical current is adjustable to provide a partial control of the magnitude of the source of magnetic energy.

4. The apparatus of claim 2 in which the means for simultaneously variably selectively energizing others of the windings on the armature is adjustable.

5. The apparatus of claim 2 in which the motor includes motor drive brushes and a pair of control brushes, disposed in electrical quadrature relationship with corresponding motor drive brushes, for each pair of magnetic poles of said motor.

6. The apparatus of claim 5 in which the means for simultaneously variably selectively energizing others of the windings on the armature is adjustable.

7. The apparatus of claim 5 in which the means for selectively connecting the windings to a source of electrical current is adjustable to provide a partial control of the magnitude of the source of magnetic energy.

8. The apparatus of claim 1 in which the means for selectively connecting the windings to a source of electrical current is adjustable to provide a partial control of the magnitude of the source of magnetic energy.

9. The apparatus of claim 1 in which the means for simultaneously variably selectively energizing others of the windings on the armature is adjustable.

10. An electrical motor, the speed of which is to be controlled, comprising;
   a. a frame;
   b. a source of magnetic energy mounted on said frame;
   c. an armature having a plurality of coil windings rotatably disposed on said frame for rotation within the field of said source of magnetic energy;
   d. a source of electric current;
   e. means for selectively energizing the coil windings on said armature from said source of electric current in such a manner as to provide motor action to said armature; and
   f. means for selectively energizing other coil windings on said armature from said sources of electric current in such a manner as to vary the effective magnitude of the field of said magnetic energy independently of the energization of said last named coil windings.

* * * * *